(12) United States Patent
Shrivathsan et al.

(10) Patent No.: US 8,160,606 B2
(45) Date of Patent: Apr. 17, 2012

(54) MOBILE LOCATION SHARING SYSTEM

(75) Inventors: Musiri Shrivathsan, San Jose, CA (US); Nicola A. Crane, San Francisco, CA (US); Richard J. Yang, Mountain View, CA (US)

(73) Assignee: TeleNav, Inc., Sunnyvale, CA (US)

( * ) Notice: Subject to any disclaimer, the term of this patent is extended or adjusted under 35 U.S.C. 154(b) by 1144 days.

(21) Appl. No.: 11/966,946

(22) Filed: Dec. 28, 2007

(65) Prior Publication Data

US 2009/0170538 A1 Jul. 2, 2009

(51) Int. Cl.
*H04W 24/00* (2009.01)

(52) U.S. Cl. .................. 455/456.1; 455/459; 455/414.1; 340/991; 340/993

(58) Field of Classification Search ........... 455/456.1–7, 455/458, 457
See application file for complete search history.

(56) References Cited

U.S. PATENT DOCUMENTS

| | | | |
|---|---|---|---|
| 6,292,671 B1 | 9/2001 | Mansour | |
| 6,429,812 B1 | 8/2002 | Hoffberg | |
| 6,888,936 B1 | 5/2005 | Groen et al. | |
| 7,099,921 B1 | 8/2006 | Engstrom et al. | |
| 7,353,034 B2* | 4/2008 | Haney | 455/457 |
| 2002/0119789 A1 | 8/2002 | Friedman | |
| 2002/0123327 A1 | 9/2002 | Vataja | |
| 2006/0223518 A1 | 10/2006 | Haney | |
| 2007/0002825 A1* | 1/2007 | O'Brien et al. | 370/351 |
| 2007/0032244 A1 | 2/2007 | Counts et al. | |
| 2007/0088818 A1 | 4/2007 | Roberts et al. | |
| 2010/0241711 A1* | 9/2010 | Ansari et al. | 709/205 |

FOREIGN PATENT DOCUMENTS

WO    WO 00/65816 A1    11/2000

\* cited by examiner

*Primary Examiner* — Vladimir Magloire

(74) *Attorney, Agent, or Firm* — Ishimaru & Associates LLP; Mikio Ishimaru; Stanley Chang

(57) ABSTRACT

A mobile location sharing system comprising: enabling a sender wireless device to send a payload including a location descriptor and a list of target identifiers to a group of targets; identifying a preferred communication mode for each in the group of targets; selecting a transmission format for the preferred communication mode; and sending the location descriptor in the transmission format selected for each in the group of targets for audio-visual output.

20 Claims, 3 Drawing Sheets

MOBILE LOCATION SHARING SYSTEM

TECHNICAL FIELD

Invention relates to sharing a geographic location from a mobile device with a group of targets.

BACKGROUND ART

Software applications for mobile communication devices enable users to share information, such as geographic location data, using a variety of techniques such as text messaging, e-mail and voice-mail. In some cases, rich information sharing is enabled when users can share application specific data. However, in some cases this may require users to have common custom software installed on their mobile communication devices in order to share effectively. Versioning can also be a problem. In addition, some information sharing services may require subscription or enrollment in order to share information. Further, sharing may be limited by the hardware of the data sender and/or the receiver.

Thus, a need still remains for a simple and effective technology enabling a user to send location information to a set of targets without worrying about the model, configuration or version of the target hardware, software and/or firmware. In view of the ever-increasing diversity in hardware and software configurations for communication devices, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a mobile location sharing system comprising: enabling a sender wireless device to send a payload including a location descriptor and a list of target identifiers to a group of targets; identifying a preferred communication mode for each in the group of targets; selecting a transmission format for the preferred communication mode; and sending the location descriptor in the transmission format selected for each in the group of targets for audio-visual output.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
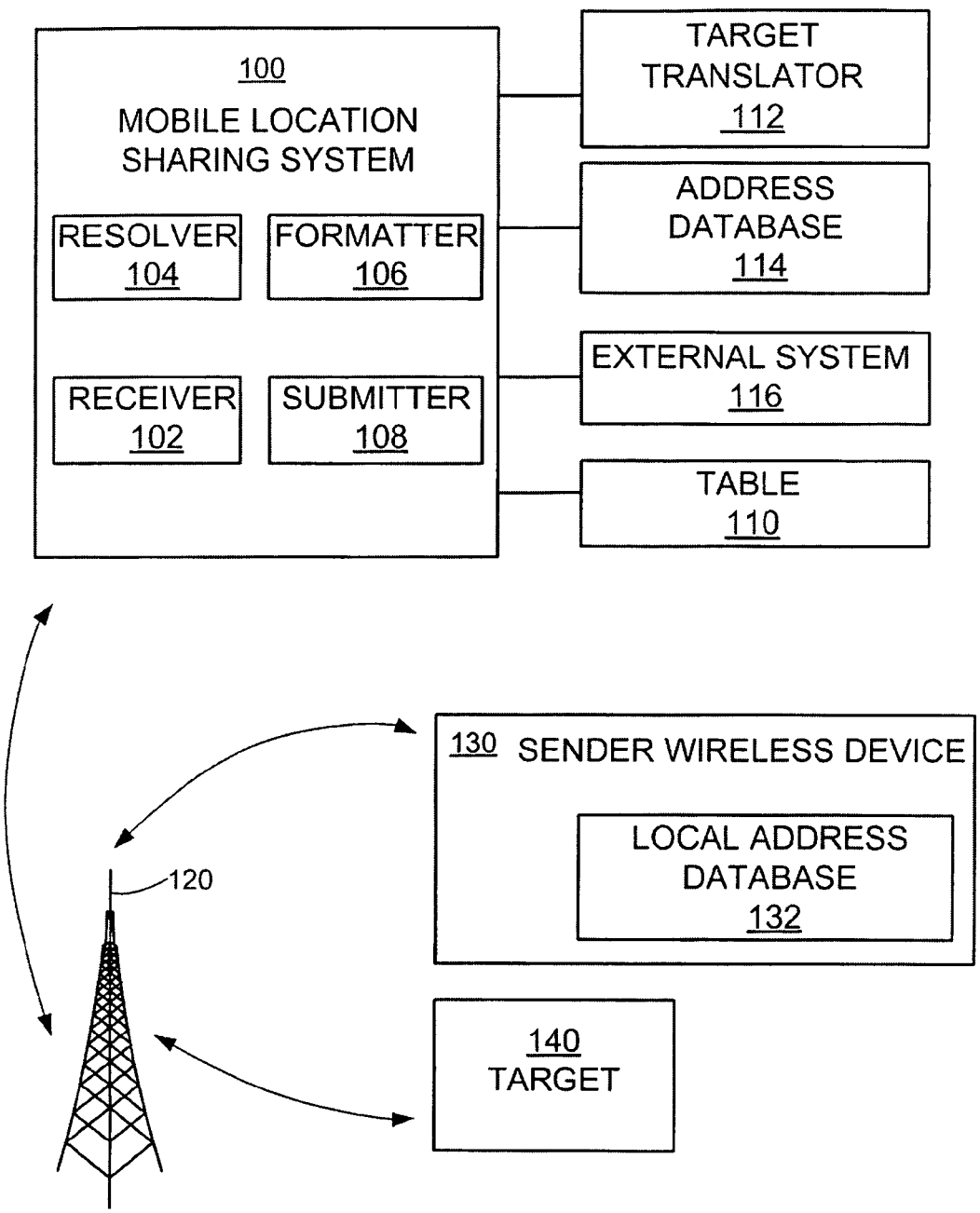
FIG. 1 illustrates an architectural view of a mobile location sharing system in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing figures. Generally, the invention can be operated in any orientation.

In addition, where multiple embodiments are disclosed and described having some features in common, for clarity and ease of illustration, description, and comprehension thereof, similar and like features from one to another will ordinarily be described with like reference numerals. The embodiments have been numbered first embodiment, second embodiment, etc. as a matter of descriptive convenience and are not intended to have any other significance or provide limitations for the present invention.

For expository purposes the term "system" as used herein means and refers to the method and to the apparatus of the present invention in accordance with the context in which the term is used.

Referring now to FIG. 1, an architectural view of a mobile location sharing system 100 in accordance with a first embodiment of the present invention is depicted. The various components and their interaction will now be described. A mobile location sharing system 100 is coupled to a wireless network 120, for receiving a payload from a sender wireless device 130 and for submitting a transmission to a target 140. The payload includes at least a location descriptor for describing a geographic location and a list of one or more target identifiers. The mobile location sharing system 100 includes a receiver 102 for receiving the payload, a resolver 104 for identifying a preferred communication mode for each target 140 described by the target identifiers, a formatter 106 for formatting a transmission based on the preferred communication mode for each target 140 and a submitter 108 for submitting the transmission to each target 140 using the preferred communication mode for each target 140. Optionally, the mobile location sharing system 100 may include or be coupled to a target translator 112 for translating a target identifier into a usable address format.

In this example, the wireless network 120 is a cellular phone network coupled to the receiver 102 and to the submitter 108. However, it is understood that in other embodiments of the current invention, the receiver and the submitter may or may not be coupled to the same network or networks. Further, the submitter may be coupled to additional or different networks such as a satellite phone network, a conventional telephone network, the Internet, an intranet, and/or other public, proprietary and/or private networks. Various embodiments of the current invention may enable location sharing across multiple operators, carriers and/or service providers. It is also understood that in other embodiments of the current invention, the receiver may or may not be directly coupled to a wireless network. For example, in some cases, hardware and/or networking systems may be disposed between the receiver and the wireless network. Furthermore, in some cases, the receiver and/or the submitter may be persistently and/or intermittently coupled to one or more networks.

The sender wireless device 130 can be a cellular phone. However it is understood that in other embodiments of the current invention, a sender wireless device 130 may take the form of a cellular telephone, satellite telephone, wireless Personal Digital Assistant (PDA), personal computer or other suitable device having wireless communications capability. The sender wireless device 130 is not necessarily equipped with a positioning capability. However, it is understood that in some embodiments, a sender wireless device 130 may be equipped with a positioning capability such as a Global Positioning System (GPS), Enhanced 911 System (E911), or some other positioning system as they become available.

The target 140 can be a cellular phone. However it is understood that in other embodiments of the current invention, one or more targets 140 may take the form of a cellular telephone, a satellite telephone, a wireless Personal Digital Assistant (PDA), a personal computer or other suitable device having wired or wireless communications capability, a conventional telephone or a voice mail box. The target 140 is not required to be equipped with custom software, firmware and/or hardware such as positioning capability. Furthermore, specialized communication software and/or hardware for communicating specifically with the current invention are not required. When the list of targets includes two or more targets, the targets are not required to have or support the same hardware, software, firmware, networking and/or network affiliation.

The payload includes at least a location descriptor and a list of one or more target identifiers. For the system illustrated in FIG. 1, the location descriptor is a street address. Note that the location descriptor does not necessarily describe the current location of the sender wireless device 130. For example, the location descriptor may describe the location of a meeting place, an accident or a point of interest. Other examples of location descriptors include, but are not limited to, geographic locations such as relative or absolute GPS coordinates in various formats such as WGS-84, NAD-83, NAD-27 and/or Universal Transverse Mercator (UTM) and relative street addresses. In some embodiments of the current invention, the mobile location sharing system may optionally support a location descriptor comprising a textual identifier such as a name, alias and/or unique identifier which may be subsequently resolved to a geographic location such as a street address or geographic coordinates. For example, optionally, the mobile location sharing system may include and/or be coupled to a public, private or group address database such as address database 114 which cross-references location descriptors comprising an identifier such as a name, alias or unique ID with a street address or geographic locations. For example, this optional element could enable a sender wireless device 130 to send a location descriptor such as "The Eiffel Tower" or "Mom's House" to a mobile location sharing system 100.

Optionally, a local address database such as local address database 132 which cross-references location descriptors comprising an identifier such as a name, alias or unique ID with geographic locations such as a street address or geographic coordinates may be included in and/or accessible by the sender wireless device, enabling the sender wireless device 130 to transmit a usable address for each target based on user input comprising identifiers such as a name or alias.

The target identifier may enable the submitter 108 to properly direct the transmission. In this example, a target identifier is a cellular phone telephone number. In other embodiments of the current invention, other examples of a target identifier may be a regular phone number, an e-mail address, a phone number associated with a voice mail box. Optionally, in some embodiments of the current invention, the mobile location sharing system may include and/or be coupled to a target translator 112 for translating a target identifier into an address format which the sender may be able to use when sending the transmission. In this case, the target identifier may be an identifier such as a locally or globally unique ID or string which resolves to a usable address such as, but not limited to, a phone number or email address. For example, optionally, a private, public and/or group address book such as address database 114 which cross-references identifiers such as name strings, aliases and/or name identifiers with usable addresses may be accessed by a target translator 112. For example, in some cases, this may enable the sender wireless device to send a location descriptor to one or more targets by using a name or alias instead of requiring the sender wireless device to provide a usable address for each target. Furthermore, this may enable a target to maintain privacy while maintaining connectivity by maintaining their actual cell phone number cross-referenced to an alias in a mobile location sharing system accessible address book such as an address database 114. The target could then provide the alias to a sender while maintaining the privacy of their actual cell phone number in this optional configuration.

The preferred communication mode enables the current invention to properly route a transmission to the target 140 and to properly communicate the geographic location to the target 140 in a usable format. Each preferred communication mode correlates with at least one appropriate network for the submitter 108 to use for submitting the transmission and at least one appropriate format for the formatter 106 to use in formatting the transmission. A variety of preferred communication modes may be supported by various embodiments of the current invention. Based on the preferred communication mode, the current invention can select the appropriate network for the submitter 108 to use when sending the transmission; for example, the transmission may be routed selectively to a telephone network, a cellular phone network and/or an e-mail server depending on the preferred communication mode for a particular target.

Based on the preferred communication mode, the formatter 106 may format the transmission into a format which may be usable by the target 140 for audio-visual output; for example, the transmission may be formatted into a synthesized voice transmission for a cell phone that is not SMS enabled, a plain text e-mail for an e-mail enabled cell phone, an SMS instant message for an SMS enabled cell phone target or into an application specific format which may be received and/or imported into a custom application when the target is running a specific custom application.

In one embodiment of the current invention, a configured web site may be supported as a preferred communication mode. For example, the mobile location sharing system 100 may be integrated with and/or coupled to one or more external systems 116 for constructing a configured website including a received location descriptor and/or a geographic location. In some cases, the configured website may include text including or describing the location descriptor and/or geographic location referred to by the location descriptor. In some cases, the configured website may include directions to and/or from the geographic location, maps and/or images. Note that in some cases, some or all of the systems used to create the configured website may be coupled to, integrated with and/or internal to the current invention. The formatter 106 may then format a transmission forwarding the address of the constructed website to the target 140. For example, in some cases, the transmission may comprise an SMS message or e-mail with the website address. In some cases, the transmission may comprise a synthesized voice message describing the website address.

The mobile location sharing system 100 illustrated in FIG. 1 receives a payload from the sender wireless device 130 through the cellular network 120 at the receiver 102. In this example, the payload is sent to the receiver 102 as a text message using SMS (Simple Message Service). The payload includes location descriptor which is submitted as a text string describing a street address. The payload also includes a list of targets in the SMS message as a textual list of cellular phone numbers. The resolver 104 accesses the list of targets 140 and determines the preferred communication mode for each target 140 in the list.

The resolver 104 may use one or more techniques for determining the preferred communication mode. For example, the preferred communication mode may be pre-configured per target or per group of targets and stored in an accessible internal and/or external database, application or table such as table 110, which is optional. In some cases, internal and/or external applications and/or services may be used to look-up the preferred communication mode. For example, a reverse phone number look-up service may provide information such as the type of device associated with the phone number (i.e. cell phone, conventional phone, fax machine, voice mail box), the carrier and/or the configuration of the target device, such as the hardware, software and/or firmware configuration. This information may be used to determine or select which formats might be usable by the target 140 for audio-visual output.

In some cases, a carrier or service provider may be identified as associated with a target 140. In some embodiments of the current invention, the resolver 104 may be capable of querying external resources such as a carrier or service provider directly or indirectly. In some cases, the external resource such as a carrier or service provider may provide information which may be used to characterize which formats might be preferred or usable by the target.

The payload includes at least a location descriptor and a list of one or more target identifiers. In some cases, the payload may comprise additional data such as the geographic location of the sender wireless device, the local time at the sender wireless device, the phone number associated with the sender wireless device, the direction of movement and/or velocity associated with the sender wireless device. In some cases, rich information sharing may be enabled when the payload includes additional data. For example, in some cases, the formatter may be enabled to incorporate some additional data in the transmission. In some cases, the current invention and/or coupled systems may optionally make use of additional data. For example, in some cases, the receiver 102, resolver 104, target translator 112, formatter 106 and/or submitter 108 may make use of additional data in their operation.

Figure 2:
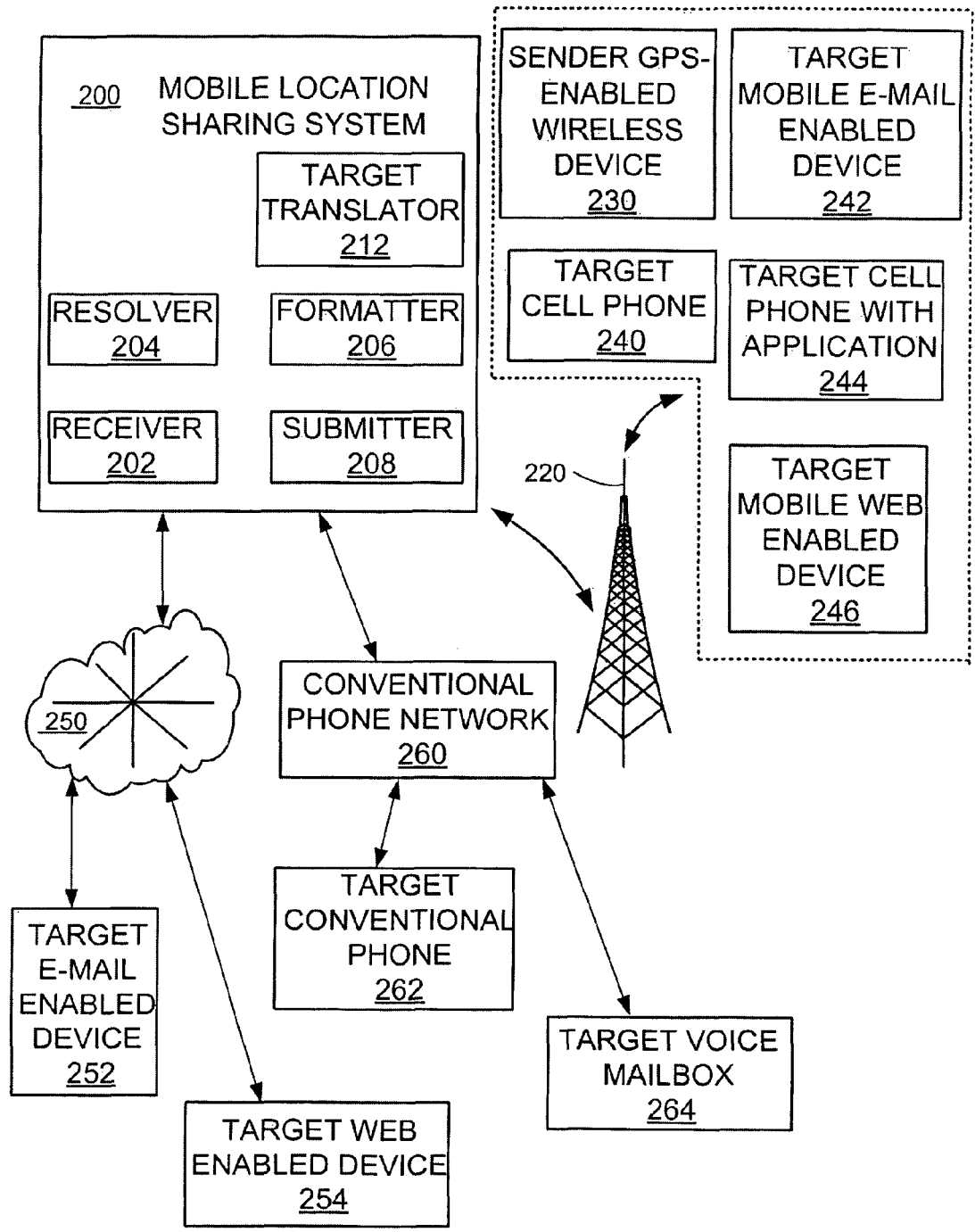
FIG. 2 illustrates an architectural view of a mobile location sharing system in a second embodiment of the present invention.

Referring now to FIG. 2, an architecture for a mobile location sharing system 200 in accordance with a second embodiment of the present invention is depicted. The various components and their interaction will now be described. A mobile location sharing system 200 is coupled to a wireless network 220, for receiving a payload from a sender GPS-enabled wireless device 230. The mobile location sharing system 200 is coupled to a wireless network 220, the Internet 250 and a conventional phone network 260 for submitting a transmission a list of targets 240, 242, 244, 246, 252, 254, 262 and 264. The payload includes at least a location descriptor for describing a geographic location and a list of target identifiers. The mobile location sharing system 200 includes a receiver 202 for receiving the payload, a resolver 204 for identifying a preferred communication mode for each target 240, 242, 244, 246, 252, 254, 262 and 264 described by the target identifiers, a formatter 206 for formatting a transmission based on the preferred communication mode for each target 240, 242, 244, 246, 252, 254, 262 and 264 and a submitter 208 for submitting the transmission to each target 240, 242, 244, 246, 252, 254, 262 and 264 using the preferred communication mode for each target 240, 242, 244, 246, 252, 254, 262 and 264. Optionally, the mobile location sharing system may include or be coupled to a target translator 212 for translating a target identifier into a usable address format.

In this example, the wireless network 220 is a cellular phone network coupled to the receiver 202 and to the submitter 208. In this example, the submitter 208 is further coupled to a conventional phone network 260 and the Internet 250. However, it is understood that in other embodiments of the current invention, the receiver and the submitter may or may not be coupled to the same network or networks. Further, the submitter may be coupled to additional or different networks such as a satellite phone network, a conventional telephone network, the Internet, an intranet, and/or other public, proprietary and/or private networks. It is also understood that in other embodiments of the current invention, the receiver may or may not be directly coupled to a wireless network. For example, in some cases, hardware and/or networking systems may be disposed between the receiver and the wireless network. Furthermore, in some cases, the receiver and/or the submitter may be persistently and/or intermittently coupled to one or more networks.

The sender wireless device 230 in FIG. 2 is a GPS-enabled cellular phone. A variety of different device examples are illustrated in FIG. 2: target mobile e-mail enabled device 242, target cell phone with application 244, target mobile web-enabled device 246, target e-mail enabled device 252, target web enabled device 254, target conventional phone 262, and target voice mailbox 264. According to the current invention, the target 240 is not required to be equipped with custom software, firmware and/or hardware such as positioning capability. Furthermore, specialized communication software and/or hardware for communicating specifically with the current invention are not required. The targets and the sender wireless device are not required to have or support the same hardware, software, firmware, networking and/or network affiliation.

The payload includes at least a location descriptor and a list of one or more target identifiers. For the system illustrated in FIG. 2, the location descriptor is a textual representation of the current location of the sender wireless device 230 as determined by the on-board GPS system. Other examples of location descriptors include, but are not limited to, geographic locations such as GPS coordinates in various formats such as WGS-84, NAD-83, NAD-27 and/or Universal Transverse Mercator (UTM) and relative or absolute street addresses. In some embodiments of the current invention, the mobile location sharing system may optionally support a location descriptor comprising an identifier such as a name, alias and/or unique identifier which may be subsequently resolved to a geographic location such as a street address or geographic coordinates. For example, optionally, the mobile location sharing system may include and/or be coupled to a public, private or group address database which cross-references location descriptors comprising an identifier such as a name, alias or unique ID with a street address or geographic locations. For example, this could enable a sender wireless device to send a location descriptor such as "The Eiffel Tower" or "Mom's House" to a mobile location sharing system.

The target identifier may enable the submitter 208 to properly direct the transmission. For the targets 240, 242, 244, 246, 252, 254, 262 and 264 illustrated in FIG. 2, examples of target identifiers may include: a cellular phone telephone number, an e-mail address, a regular phone number and/or a phone number associated with a voice mail box. Optionally, in some embodiments of the current invention, the mobile location sharing system may include and/or be coupled to a target translator 212 for translating a target identifier into an address format which the submitter 208 may be able to use when sending the transmission.

The preferred communication mode enables the current invention 200 to properly route a transmission to a target targets 240, 242, 244, 246, 252, 254, 262 and 264 and to properly communicate the geographic location to the target in a usable format for audio-visual output. Each preferred communication mode correlates with at least one appropriate network for the submitter 208 to use for submitting the transmission and at least one appropriate format for the formatter 206 to use in formatting the transmission. A variety of preferred communication modes may be supported by various embodiments of the current invention. Based on the preferred communication mode, the current invention can select the appropriate network for the submitter 208 to use when sending the transmission; for example, the transmission may be routed selectively to a telephone network, a cellular phone network, an e-mail server depending on the preferred communication mode for a particular target. In some embodiments of the current invention, a target may be associated with more than one preferred communication mode which may or may not be prioritized. For example, this optional feature could support sending multiple transmissions per target. In some cases, this optional feature could support sending a transmission to a secondary address or phone number if the preferred communication mode or target was not available or not supported by the particular embodiment of the current invention. In some cases, this optional feature could support sending multiple transmissions per target to the same device using different formats such as sending both an SMS message and a synthesized voice message to an SMS-enabled cell phone.

Based on the preferred communication mode, the formatter 206 may format the transmission into a format which may be usable by the target for audio-visual output; for example, the transmission may be formatted into a synthesized voice mail for a traditional phone network target 262 or 264, a plain text e-mail for an e-mail target 252 or 242, an SMS instant message for an SMS enabled cell phone target or into an application specific format which may be received and/or imported into a custom application when the target 244 is running a specific custom application.

The mobile location sharing system 200 illustrated in FIG. 2 receives a payload from the sender wireless device 230 through the cellular network 220 at the receiver 202. In this example, the payload is sent to the receiver 202 as a text message using SMS (Simple Message Service). The payload includes a location descriptor which is submitted as a text string describing the current GPS location of the sender wireless device 230. The payload also includes a list of targets 240, 242, 244, 246, 252, 254, 262 and 264 in the SMS message as a textual list of phone numbers and/or e-mail address. The resolver 204 accesses the list of targets and determines the preferred communication mode for each target in the list.

The payload includes at least a location descriptor and a list of one or more target identifiers. In this example, the payload includes the current location of the sender wireless device 230. In some cases, the payload may comprise additional data such as the local time at the sender wireless device, the phone number associated with the sender wireless device, the direction of movement and/or velocity associated with the sender wireless device. In some cases, rich information sharing may be enabled when the payload includes additional data. For example, in some cases, the formatter 206 may incorporate some additional data in the transmission. In some cases, the current invention may optionally make use of additional data. For example, in some cases, the receiver 202, resolver 204, target translator 212, formatter 206 and/or submitter 208 may make use of additional data in their operation.

In some embodiments of the current invention, the mobile location sharing system may be designed to be extensible. For example, enabling a new communication mode may require upgrading the resolver to identify the preferred communication mode, upgrading the formatter to enable proper formatting of the transmissions and/or upgrading the submitter to properly couple to a new target network. New hardware, software and/or firmware configurations associated with the sender wireless device and/or a target device may enable rich information sharing in some embodiments of the current invention.

Figure 3:
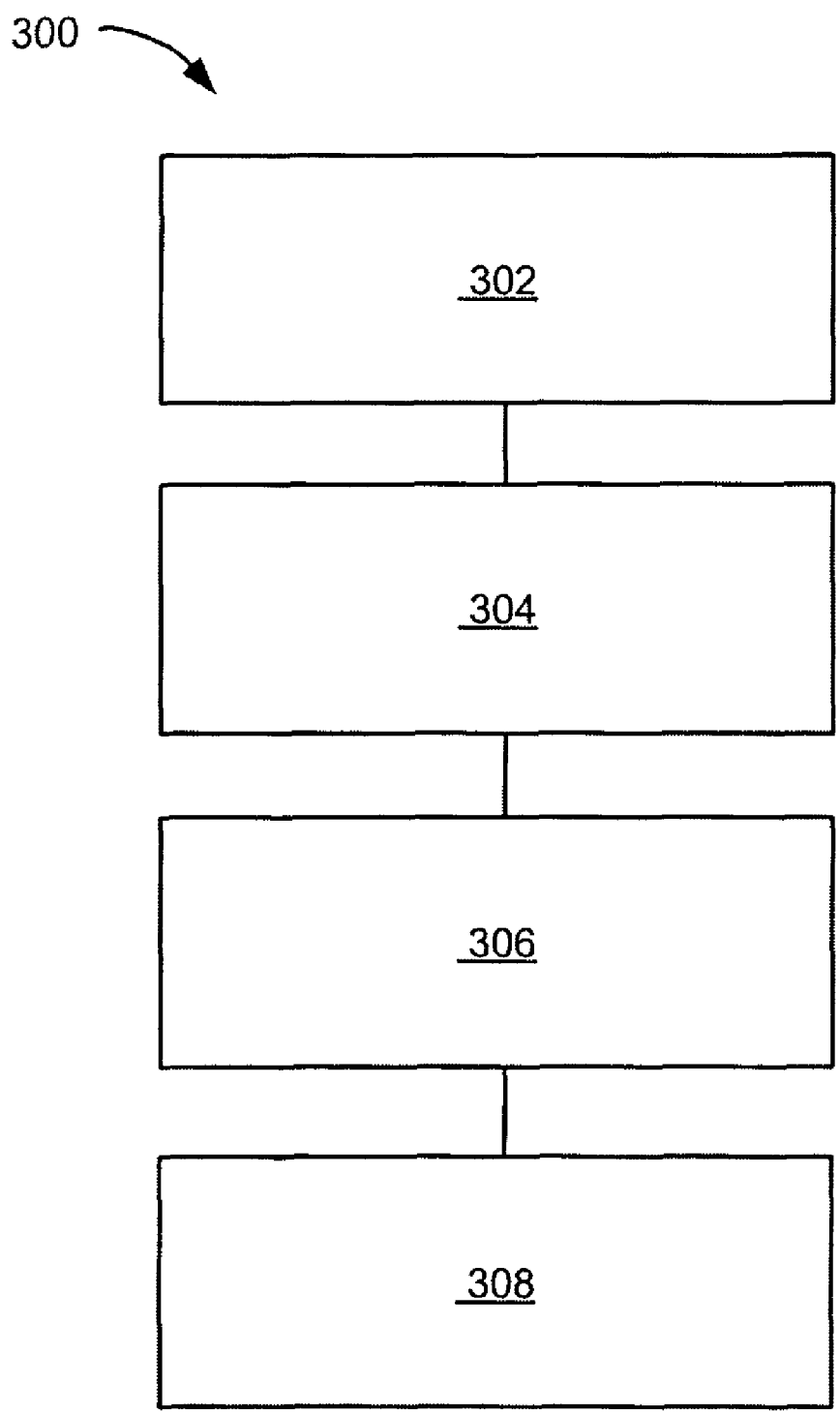
FIG. 3 is a flow chart of a method of a mobile location sharing in an embodiment of the present invention.

Referring now to FIG. 3, therein is shown a flow chart of a mobile location sharing system 300 for operating the mobile location sharing system 100 in an embodiment of the present invention. The system 300 includes enabling a sender wireless device to send a payload including a location descriptor and a list of target identifiers to a group of targets in a block 302; identifying a preferred communication mode for each in the group of targets in a block 304; selecting a transmission format for the preferred communication mode in a block 306; and sending the location descriptor in the transmission format selected for each in the group of targets for audio-visual output in a block 308.

It has been discovered that the present invention provides a system enabling a sender wireless device to send a location descriptor to a list of targets without requiring the target to subscribe to a particular service or network and without requiring the target to install or own custom software, firmware or hardware. Furthermore, the sender is not required to have specific knowledge or understanding of the hardware, software, firmware or networking configuration of the targets.

Yet another important aspect of the present invention is that it valuably supports the privacy of the target by enabling the usage of target identifier strings which are cross-referenced at the address exchange server with actual cell phone numbers, enabling a sender to communicate with a target without knowledge of their actual cell phone number.

These and other valuable aspects of the present invention consequently further the state of the technology to at least the next level.

Thus, it has been discovered that the mobile location sharing system of the present invention furnishes important and heretofore unknown and unavailable solutions, capabilities, and functional aspects for improving usability and increasing privacy. The resulting processes and configurations are straightforward, uncomplicated and highly versatile and can be implemented by adapting known components for ready, efficient, and economical application and utilization.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method for operating a mobile location sharing system comprising:
   receiving a payload including a location descriptor and a list of target identifiers to a target of a group of targets for location sharing from a sender wireless device, the location descriptor includes at least two of a meeting place, an accident location, a point of interest, a name, an alias, or a unique ID name with a street address;
   identifying a preferred communication mode for each in the group of targets, the preferred communication mode is an appropriate network for the target including at least two of a telephone network, a cellular phone network, a voice mail box, or an e-mail server;
   selecting a transmission format for the preferred communication mode;
   sending the location descriptor in the transmission format selected for each in the group of targets for audio-visual output, the audio-visual output includes the transmission format formatted to a synthesized voice message; and
   identifying an unavailability of at least one target to the transmission format; and
   resending the location descriptor in a different transmission format to the target with the unavailability.

2. The method as claimed in claim 1 wherein receiving the payload including the location descriptor and the list of target identifier associated with the group of targets.

3. The method as claimed in claim 1 wherein selecting the transmission format includes formatting the location descriptor for text format, audio format, visual format, or a combination thereof.

4. The method as claimed in claim 1 further comprising:
   creating a website having a website address with the website including the location descriptor; and
   wherein sending the location descriptor includes sending the website address.

5. The method as claimed in claim 1 wherein:
   receiving the payload includes receiving additional data; and
   selecting the transmission format includes formatting a portion of the additional data.

6. A method of operating a mobile location sharing system comprising:
   receiving a payload including a location descriptor for describing a geographic location to a target of a group of targets with each of the target having a target identifier, the location descriptor includes at least two of a meeting place, an accident location, a point of interest, a name, an alias, or a unique ID name with a street address;
   sending to a submitter the payload including the location descriptor and the target identifier for the group of targets;
   identifying a preferred communication mode for the target identifier, the preferred communication mode is an appropriate network for the target including at least two of a telephone network, a cellular phone network, a voice mail box, or an e-mail server;
   translating the target identifier into a usable address;
   formatting a transmission having the location descriptor for the target identifier based on a preferred communication mode including the transmission formatted to a synthesized voice message for audio-visual output;
   sending the transmission to the usable address for the target identifier for mobile location sharing for display;
   identifying an unavailability of the usable address to the transmission; and
   resending the location descriptor in a different transmission format to the usable address with the unavailability.

7. The method as claimed in claim 6 wherein:
   receiving the payload having the location descriptor includes receiving a textual identifier; and
   further comprising:
   resolving the location descriptor into the geographic location.

8. The method as claimed in claim 6 wherein formatting the transmission includes formatting the geographic location.

9. The method as claimed in claim 6 further comprising:
   creating a website having a website address with the website including the geographic location; and
   wherein formatting the transmission includes:
   sending the transmission including the website address and the geographic location for display.

10. The method as claimed in claim 6 wherein the target identifier includes a telephone number, an email address, an alias name, or any combination thereof.

11. A mobile location sharing system comprising:
    a receiver for receiving a payload from a sender wireless device with the payload including at least a location descriptor and a list of one or more target identifiers, the location descriptor includes at least two of a meeting place, an accident location, a point of interest, a name, an alias, or a unique ID name with a street address;
    a resolver coupled to the receiver for receiving the list of one or more target identifiers, for determining therefrom a preferred communication mode for each of the target identifier, and for identifying an unavailability of at least one target to the preferred communication mode, the preferred communication mode is an appropriate network for the target including at least two of a telephone network, a cellular phone network, a voice mail box, or an e-mail server;
    a formatter coupled to the resolver for receiving the preferred communication mode and for formatting a transmission for each of the target identifier based on the preferred communication mode for each of the target identifier for audio-visual output, the audio-visual output includes the transmission formatted to a synthesized voice message; and
    a submitter coupled to the formatter for sending the transmission having the location descriptor to each of the target identifier using the preferred communication mode for each of the target identifier for mobile location sharing and for resending the location descriptor in a different transmission format to the target with the unavailability.

12. The system as claimed in claim 11 wherein the formatter formats the location descriptor for text format, audio format, visual format, or a combination thereof.

13. The system as claimed in claim 11 wherein the receiver is for transmitting a website address of a configured website that displays a geographic location associated with the location descriptor.

14. The system as claimed in claim 11 wherein:
    the receiver is for receiving additional data from the sender wireless device; and
    the formatter is coupled to the receiver for receiving and formatting a portion of the additional data.

15. The system as claimed in claim 11 wherein the receiver includes a submitter for receiving the payload including the location descriptor and the target identifier for the group of targets.

16. The system as claimed in claim 11 wherein the receiver identifies a geographic location associated with the location descriptor.

17. The system as claimed in claim 16 wherein the resolver includes means for translating the target identifier into a usable address.

18. The system as claimed in claim 16 wherein the receiver receives the location descriptor having a textual identifier and extracts the geographic location associated with the location descriptor.

19. The system as claimed in claim 16 wherein the formatter formats the geographic location for transmission.

20. The system as claimed in claim 16 wherein the target identifier includes a telephone number, an email address, an alias name, or any combination thereof.

* * * * *